United States Patent
Ambe

(10) Patent No.: US 9,304,887 B2
(45) Date of Patent: Apr. 5, 2016

(54) METHOD AND SYSTEM FOR OPERATING SYSTEM (OS) VERIFICATION

(71) Applicant: International Business Machines Corporation, Armonk, NY (US)

(72) Inventor: Suma Ambe, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 14/027,624

(22) Filed: Sep. 16, 2013

(65) Prior Publication Data

US 2015/0081875 A1 Mar. 19, 2015

(51) Int. Cl.
*G06F 15/173* (2006.01)
*G06F 11/30* (2006.01)
*G06F 11/36* (2006.01)
*G06F 17/30* (2006.01)

(52) U.S. Cl.
CPC ........ *G06F 11/3065* (2013.01); *G06F 11/3604* (2013.01); *G06F 17/30* (2013.01)

(58) Field of Classification Search
None
See application file for complete search history.

(56) References Cited

U.S. PATENT DOCUMENTS

| | | | | |
|---|---|---|---|---|
| 6,122,663 A * | 9/2000 | Lin | ........................... | G06F 9/50 709/224 |
| 6,792,556 B1 * | 9/2004 | Dennis | ................... | G06F 9/4401 714/36 |
| 7,356,679 B1 * | 4/2008 | Le | ..................... | G06F 17/30067 707/E17.01 |
| 7,464,105 B2 | 12/2008 | Smith | | |
| 7,503,041 B2 * | 3/2009 | Butterweck | ............... | G06F 8/60 717/168 |
| 7,536,596 B2 * | 5/2009 | Johnson | ................ | G06F 11/261 714/25 |
| 7,694,121 B2 | 4/2010 | Willman et al. | | |
| 7,921,461 B1 * | 4/2011 | Golchikov | ............ | G06F 21/575 713/2 |
| 7,930,308 B2 | 4/2011 | Smith | | |
| 8,032,790 B2 | 10/2011 | Chopra et al. | | |
| 8,042,107 B2 | 10/2011 | Amodio et al. | | |
| 8,341,602 B2 | 12/2012 | Hawblitzel et al. | | |
| 8,639,552 B1 * | 1/2014 | Chen | ..................... | G06F 9/4881 705/7.21 |
| 2007/0006018 A1 * | 1/2007 | Thompson | .......... | G06F 11/1466 714/6.12 |

(Continued)

FOREIGN PATENT DOCUMENTS

CN 104461860 A 3/2015

OTHER PUBLICATIONS

"CA Verify Automated Regression Testing for CICS r8.5", Copyright 2011 CA., pp. 1-6.

*Primary Examiner* — Viet Vu
*Assistant Examiner* — James Edwards
(74) *Attorney, Agent, or Firm* — Ronald Kaschak; Michael Petrocelli

(57) ABSTRACT

A method for operating system application performance verification of a mainframe server system is provided. The method comprises comparing system snapshots of the operating system application. The method further comprises determining results of operational changes to the operating system application based on the compared system snapshots. The method further comprises comparing system log verification of the operating system application with previous system logs of the operating system application. The method further comprises determining results of operational changes to the operating system application based on the compared system log verification with the previous system logs. The method further comprises determining results of operational changes to the operating system application based on the compared system log verification with the previous system logs. The method further comprises performing system checkouts of vendor tools installed on the operating system application.

17 Claims, 7 Drawing Sheets

(56) References Cited

U.S. PATENT DOCUMENTS

| | | | | |
|---|---|---|---|---|
| 2008/0126773 A1* | 5/2008 | Martinez | G06F 21/57 | 713/1 |
| 2010/0077165 A1* | 3/2010 | Lu | G06F 11/1451 | 711/162 |
| 2011/0191343 A1* | 8/2011 | Heaton | G06F 19/3443 | 707/737 |
| 2014/0325170 A1* | 10/2014 | Aswathanarayana | G06F 9/45558 | 711/162 |

* cited by examiner

METHOD AND SYSTEM FOR OPERATING SYSTEM (OS) VERIFICATION

FIELD OF THE INVENTION

The present invention relates generally to operating systems of system software of a computer system, and more particularly to operating system application performance verification of mainframe server systems.

BACKGROUND

An operating system is a software program or a collection of software programs that operate on a computer to provide a platform on which software applications can execute. Examples of operating systems include, for example, Advanced Interactive eXecutive AIX® (Advanced Interactive eXecutive AIX® (AIX is a registered trademark of International Business Machines Corporation in the United States, other countries or both), IBM® z/VSE® (Virtual Storage Extended) (IBM and z/VSE are registered trademarks of International Business Machines Corporation in the United States, other countries or both), Linux® on System z® (Linux is a registered trademark of Linus Torvalds in the United States, other countries or both, and System z is a registered trademark of International Business Machines Corporation in the United States, other countries or both), and the like. Moreover, operating systems typically perform essential functions required to maintain proper operation of software applications executing on the computer. However, some software applications may experience error conditions. Further, a software error or crash can cause other software executing on the computer to cease execution of program instructions. A software developer or systems administrator may correct a defect in a software program to improve reliability and performance of the software program. Further, in order correct the defect in the software program, software developers typically employ a variety of methods or tools.

SUMMARY

In one embodiment, a method for operating system application performance verification of a mainframe server system is provided. The method comprises comparing, by one or more processors, system snapshots of the operating system application before and after the mainframe server system is rebooted, wherein comparison of the system snapshots includes performance verification of the system snapshots of the operating system application. The method further comprises determining, by the one or more processors, results of operational changes to the operating system application based on the compared system snapshots. The method further comprises comparing, by the one or more processors, system log verification of the operating system application with previous system logs of the operating system application. The method further comprises determining, by the one or more processors, results of operational changes to the operating system application based on the compared system log verification with the previous system logs. The method further comprises performing, by the one or more processors, system checkouts of vendor tools installed on the operating system application.

In another embodiment, a computer system for operating system application performance verification of a mainframe server system is provided. The computer system comprises one or more processors, one or more computer-readable memories, one or more computer-readable tangible storage devices and program instructions which are stored on at least one of the one or more storage devices for execution by at least one of the one or more processors via at least one of the one or more memories. The computer system further comprises program instructions compare system snapshots of the operating system application before and after the mainframe server system is rebooted, wherein comparison of the system snapshots includes performance verification of the system snapshots of the operating system application. The computer system further comprises program instructions to determine results of operational changes to the operating system application based on the compared system snapshots. The computer system further comprises program instructions to compare system log verification of the operating system application with previous system logs of the operating system application. The computer system further comprises program instructions to determine results of operational changes to the operating system application based on the compared system log verification with the previous system logs. The computer system further comprises program instructions to perform system checkouts of vendor tools installed on the operating system application.

In yet another embodiment, computer program product for operating system application performance verification of a mainframe server system is provided. The computer program product comprises one or more computer-readable tangible storage devices and program instructions stored on at least one of the one or more storage devices. The computer program product comprises program instructions compare system snapshots of the operating system application before and after the mainframe server system is rebooted, wherein comparison of the system snapshots includes performance verification of the system snapshots of the operating system application. The computer program product further comprises program instructions to determine results of operational changes to the operating system application based on the compared system snapshots. The computer program product further comprises program instructions to compare system log verification of the operating system application with previous system logs of the operating system application. The computer program product further comprises program instructions to determine results of operational changes to the operating system application based on the compared system log verification with the previous system logs. The computer program product further comprises program instructions to perform system checkouts of vendor tools installed on the operating system application.

In yet another embodiment, a method for performing operating system (OS) checkout procedures is provided. The method, computer system and computer program product comprises performing, by a first tool, OS checkout procedures on system libraries of a mainframe computer. The method, computer system and computer program product further comprises performing, by the first tool, OS checkout procedures on status of a memory of the mainframe computer. The method, computer system and computer program product further comprises performing, by the first tool, OS checkout procedures on any system changes made to the mainframe computer. The method, computer system and computer program product further comprises performing, by the first tool, OS checkout procedures for third party products installed on the mainframe computer.

BRIEF DESCRIPTION OF THE SEVERAL VIEWS OF THE DRAWINGS

Novel characteristics of the invention are set forth in the appended claims. The invention itself, however, as well as preferred mode of use, further objectives, and advantages thereof, will be best understood by reference to the following detailed description of the invention when read in conjunction with the accompanying figures, wherein, like reference numerals indicate like components, and:

DETAILED DESCRIPTION

Figure 1:
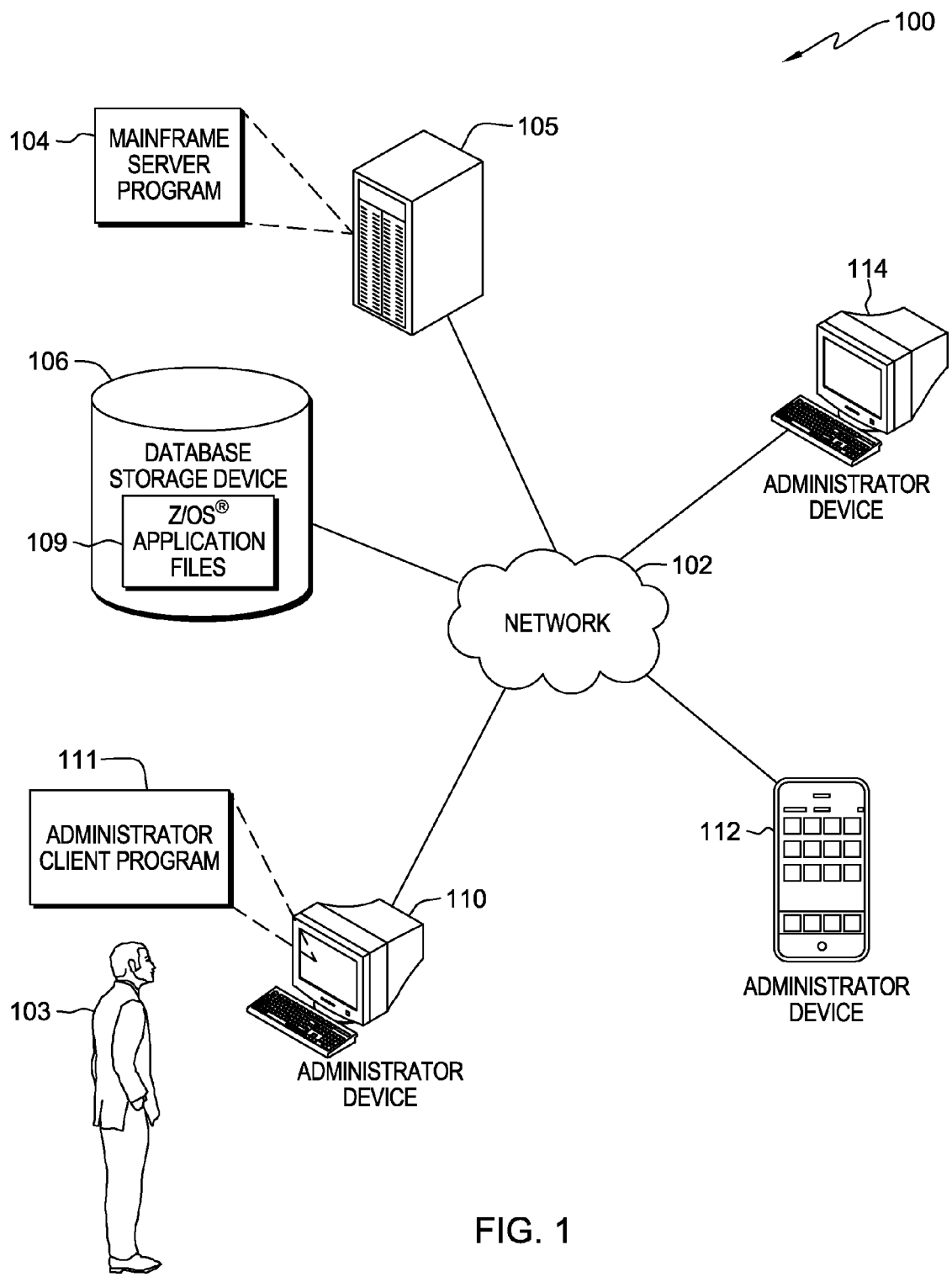
FIG. 1 is a functional diagram of a z/OS® application verification environment in accordance with embodiments of the present invention.

The present invention will now be described in detail with reference to the accompanying Figures. Referring now to FIG. 1, operating system (OS) verification environment 100 for performing mainframe OS verification of one or more operating systems of a mainframe server system operating within OS verification environment 100 is shown. The OS can be, for example, IBM® z/OS®. IBM® z/OS® is an enterprise operating system application which operates Internet and other software program applications of mainframe server systems, thus providing a comprehensive and diverse application execution environment of the mainframe server systems. The present invention includes an integrated system checkup tool kit (ISTK) that performs z/OS® application performance verification based on operations of the z/OS® application within a mainframe server system. For example, according to at least one embodiment, performance verification of the z/OS® application by the ISTK includes comparison of system snapshots of the z/OS® application, before and after the mainframe server system is rebooted, wherein comparison of the system snapshots includes performance verification of system libraries, memory, versions, or paging details of the system snapshots of the z/OS® application, system log (syslog) verification of the z/OS® application with previous system logs of the z/OS® application, and performance of third party vendor tools operating within the mainframe server system in OS verification environment 100.

The ISTK can also serve as a debugging aid for verifying z/OS® application syslog processing of the mainframe server system, wherein the ISTK filters system errors of syslog processing of the z/OS® application, and provides a debugging list of the system errors of the mainframe server system.

The ISTK performs system verification of the z/OS® application automatically, over a period of consecutive times, unless or until ISTK is invoked by a systems administrator of the mainframe computing system, wherein the systems administrator can invoke the ISTK based on performance monitoring of the mainframe server system.

Consider, for example, a situation in which the z/OS® application needs an upgrade, and the mainframe server system requires performance of testing of the z/OS® application, including, performance verification, and testing of all products, including, third party products of the z/OS® application. In this manner, the systems administrator or systems programmer can optionally invoke the ISTK tool of the z/OS® application to perform verification of operating system logs of the z/OS® application, before and after the mainframe computing system is rebooted. Once the systems administrator selects options to perform operating system verification in the ISTK tool, the ISTK tool automatically performs the verification of systems performance of the mainframe computing system. In another example, consider a situation in which the mainframe server system includes a particular independent software vendor product upgrade. The systems administrator can invoke the ISTK for performance verification of the independent software vendor product, which can include checkouts of performance verification, wherein the ISTK performs checkout verification and displays a result of the performance verification to the systems administrator.

OS application verification environment 100 includes administrator devices 110, 112, 114, mainframe server system 105, and database storage device 106, interconnected over network 102. Administrator devices 110, 112, 114, and database storage device 106 operate over network 102 to facilitate performance verification of an operating system of mainframe server system 105, wherein the performance verification of the OS includes, for example, verification of libraries, status of memory. The performance verification of the OS also includes checkout performance verification of third party vendors installed on the mainframe server system 105.

Administrator devices 110, 112, 114 can be, for example, a laptop, tablet, or notebook personal computer (PC), a desktop computer, a mainframe or mini computer, a personal digital assistant (PDA), or a smart phone such as a Blackberry® (Blackberry is a registered trademark of Research in Motion Limited (RIM) Inc., in the United States, other countries, or both) or iPhone® (iPhone is a registered trademark of Apple Inc., in the United States, other countries, or both), respectively administrator devices 110, 112, 114 include administrator client program 111. Administrative client program 111 can be any type of software application in which the systems administrator or systems programmer 103 can optionally invoke the ISTK tool of the mainframe computing system to perform verification operating system logs of the z/OS® application, before and after the mainframe computing system is rebooted, in accordance with at least one embodiment of the present invention.

Mainframe server system 105 can be, for example, a mainframe server computer system such as a management server, a web server, or any other electronic device or computing system capable of receiving and sending data performance verification of z/OS® application in OS verification environment 100. Mainframe server system 105 can also represent a "cloud" of computers interconnected by one or more networks, wherein mainframe server system 105 is a primary server for a computing system utilizing clustered computers when accessed through network 102. For example, a cloud computing system can be an implementation of an integrated system tool that provides a facility to perform the z/OS® application performance verification of mainframe server system 105. Mainframe server system 105 includes mainframe server program 104. Mainframe server program 104 includes an integrated system tool that provides a facility to perform the z/OS® application performance verification of mainframe server system 105, including, verification of system libraries, verification of status of memory, and verification of performance of third party vendor products installed or operating on mainframe server system 105, of operating system logs of the z/OS® application, before and after mainframe server device 105 is rebooted, in accordance with embodiments of the present invention. Database storage device 106 is any type of storage device, storage server, storage area network, redundant array of independent discs (RAID), cloud storage service, or any type of data storage. Database storage device can be, for example, DB2® (DB2 is a registered trademark of International Business Machines Corporation in the United States, other countries or both). DB2® can be relational model database server. The relational model for database management of database storage device 106 is a database model based on first-order predicate logic. In the relational model of a database, all data is represented in terms of tuples, grouped into relations. For example, a database organized in terms of the relational model is a relational database. A relation of the relational model is defined as a set of tuples that have the same attributes. Database storage device 106 further includes z/OS® application files 109. z/OS® application files 109 includes information pertaining to verification of z/OS® application performance of mainframe server system 105 stored in database storage device 106.

Network 102 includes one or more networks of any kind that can provide communication links between various devices and computers connected together within OS verification environment 100. Network 102 can also include connections, such as wired communication links, wireless communication links, or fiber optic cables. Network 102 can also be implemented as a number of different types of networks, including, for example, a local area network (LAN), wide area network (WAN) or a packet switched telephone network (PSTN), or some other networked system. For example, z/OS® application verification environment 100 can utilize the Internet with network 102 representing a worldwide collection of networks. The term "Internet" as used according to embodiments of the present invention refers to a network or networks that uses certain protocols, such as the TCP/IP protocol, and possibly other protocols such as the hypertext transfer protocol (HTTP) for hypertext markup language (HTML) documents that make up the world wide Web (the web).

Figure 2:
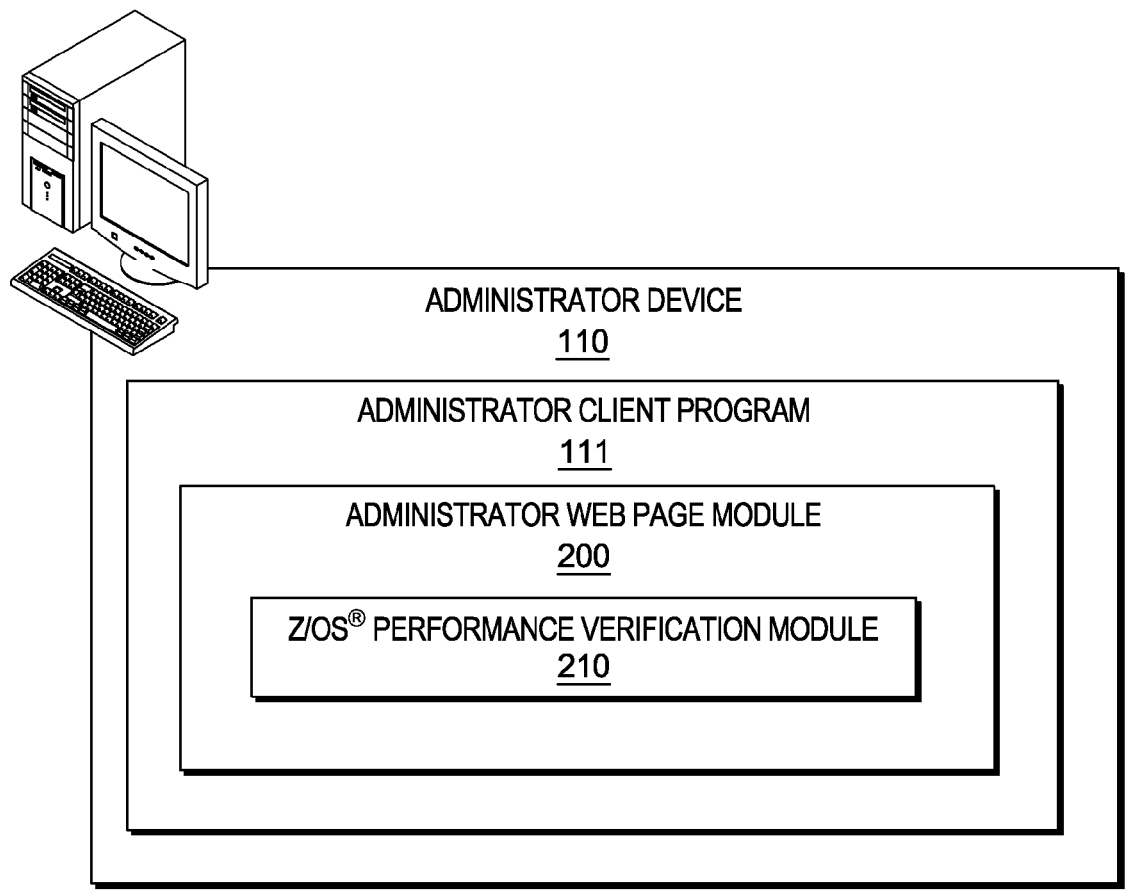
FIG. 2 is a functional block diagram illustrating program components of an administrator device in accordance with an embodiment of the present invention.

FIG. 2 is a functional block diagram illustrating program components of administrator device 110 in accordance with an embodiment of the present invention. Administrative client program 111 can, among other things, retrieve and display content accessible via network 102, such as web pages, web server z/OS® application systems verification information, or mainframe server z/OS® application systems verification during verification of system libraries, verification of status of memory, and verification of performance of third party vendor products installed of operating system log of the z/OS® application, before and after mainframe server system 105 is rebooted, in accordance with the present invention.

Administrator client program 111 can be a web server browser program. Examples of web browsers include Internet Explorer® (Internet Explorer is a trademark of Microsoft Inc., in the United States, other countries or both), Firefox® (Firefox is a trademark of Mozilla Corporation, in the United States other countries, or both), Safari® (Safari is a trademark of Apple, Inc. in the United States, other countries, or both) and Google Chrome™ (Google Chrome is a trademark of Google, Inc. in the United States, other countries, or both), respectively. Administrator client program 111 includes administrative web page module 200. Administrative web page module 200 is a web browser plugin/add-on that extends the functionality of administrative client program 111 by adding additional user interface elements to administrative client program 111.

Administrative web page module 200 includes z/OS® performance verification module 210, which is received in administrative client program 111 from mainframe server program 104. For example, z/OS® performance verification module 210 can include program code, such as Hypertext Markup Language (HTML) code or JavaScript code that, when executed, adds one or more user interface elements to administrative client program 111 for performance verification of z/OS® application of mainframe server system 105.

The additional user interface elements of z/OS® performance verification module 210 allows system administrators 103 to invoke the ISTK tool of mainframe server system 105 to perform verification of comparison of operating system log of previous OS logs of the z/OS® application before and after the mainframe computing system is rebooted. According to at least one embodiment, the additional user interface element also allows administrator 103 to invoke the ISTK for performance verification of the independent software vendor product, which can include checkouts of performance verification, wherein the ISTK performances checkout verification and displays a result of the performance verification to administrator 103 in the additional user interface elements of administrative web page module 200.

Figure 3:
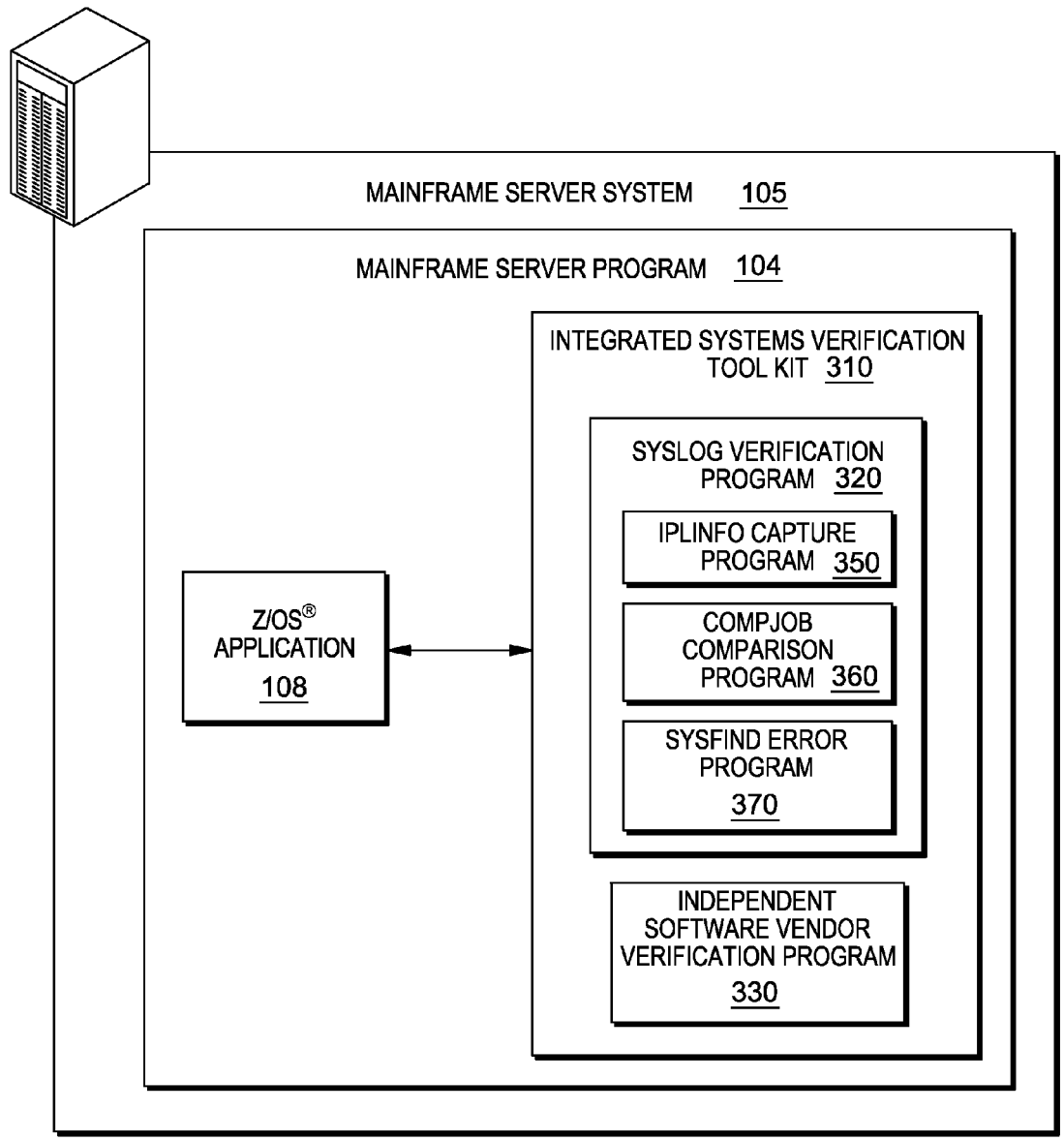
FIG. 3 is a functional block diagram illustrating program components of mainframe server system in accordance with an embodiment of the present invention.

FIG. 3 is a functional block diagram illustrating program components of mainframe server system 105 for performing z/OS® application performance verification of mainframe server system 105 within OS verification environment 100, including, for example, comparison of system snapshots of the z/OS® application, before and after the mainframe server system is rebooted, wherein comparison of the system snapshots includes performance verification of system libraries, memory, versions, or paging details of the system snapshots of the z/OS® application, system log (syslog) verification of the z/OS® application with previous system logs of the z/OS® application, and performance of third party vendors operating within the mainframe server system in OS verification environment 100. For example, in the depicted embodiment, mainframe server program 104 includes z/OS® application 108 and ISTK 310. z/OS® application 108 is executed by mainframe server program 104 within mainframe server system 105, wherein the state of operation of z/OS® application 108 is examined by ISTK 310 of mainframe server program 104. ISTK 310 performs verification of operating performance of z/OS® application 108 based on the examined state of operations of z/OS® application 108. For example, mainframe server program 104 examines operating system program executions of z/OS® application 108 periodically, randomly, and/or using event-based monitoring. As described, z/OS® application 108 is an enterprise operating system which operates Internet and other software program applications of mainframe computing device, thus providing a comprehensive and diverse application execution environment of mainframe server system 105.

According to at least one embodiment, mainframe server program 104 utilizes ISTK 310 to provide a summary of reports of operational changes or operational measures of z/OS® application 108 after mainframe server computer is rebooted, compares operating system logs (syslog) of z/OS® application 108 of previous operating system logs, including, verification and comparison of system libraries, status of memory of mainframe server computing device, and also, provides verification of performance of third party vendor products installed or operating on mainframe server system 105, in accordance with the present invention. ISTK 310 stores reports of checkups and verifications of z/OS® application 108 in database. For example, in at least one embodiment, ISTK 310 can be a software product that is written in restructured extended executor (REXX), which is suitable for providing command procedures, application front ends, user-defined macros, such as editor subcommands, or prototyping of ISTK 310, in accordance with embodiments of the present invention.

ISTK 310 also provides the facility to compare, and save results of operational verifications of z/OS® application 108 mainframe server system 105, and reduce the amount of time spent on manual verifications or checkouts of z/OS® application 108 by using dynamic automatic command structures to provide performance verification of z/OS® application 108, without manual intervention of performance verification of z/OS® application 108, including, for example, manual comparison of operational changes to z/OS® application 108, manual storing of previous syslogs of z/OS® application 108, or manual verification of third party vendors products on mainframe server system 105.

ISTK 310 includes syslog verification program 320, and independent software vendor verification program 330. Syslog verification program 320 conducts performance verification of z/OS® application 108, including, for example, comparison system log verification of z/OS® application 108 with previous system logs of z/OS® application 108, determined over consecutive periods. Syslog verification program 320 also compares operating system logs (syslog) of z/OS® application 108 of previous operating system logs, including, verification and comparison of system libraries, status of memory of mainframe server system 105. Syslog verification program 320 also serves as a debugging aid for verifying syslog operating performance of z/OS® application 108, wherein the syslog filters system errors of syslog processing of z/OS® application 108, and provides a debugging list of the system errors of z/OS® application 108. Syslog verification program 320 includes IPLINFO capture program 350, COMPJOB comparison program 360 and SYSFIND error program 370.

IPLINFO capture program 350 captures a snapshot of z/OS® application 108 before mainframe server system 105 is rebooted or powered down. For instance, the snapshot include program list of z/OS® application 108, including, for example, linklist, aplist, lpalst list, version information list, page data sets list, and system memory list of z/OS® application 108. IPLINFO capture program 350 can be dynamically executed before mainframe server system 105 is rebooted. According to at least one embodiment, a report of the snapshot is stored in database storage device 106, and it is retrievable for viewing by administrator 103 in administrator client program 111. COMPJOB comparison program 360 compares output reports of program files of IPLINFO capture program 350 that represent z/OS® application 108, before and after mainframe computing device is rebooted. For example, COMPJOB comparison program 360 displays results of the compared output report to administrator 103, which allows, administrator 103 to identify operational changes of z/OS® application 108. Moreover, SYSFIND error program 370 provides a display of a list of operational errors of z/OS® application 108, for transmittal and display to administrative client program 111. Independent software vendor verification program 330 performs verification of third party vendor tools installed on mainframe server system 105. For example, independent software vendor verification program 330 determines and identifies active system data tasks of the third party vendors installed on mainframe server system 105.

Figure 4:
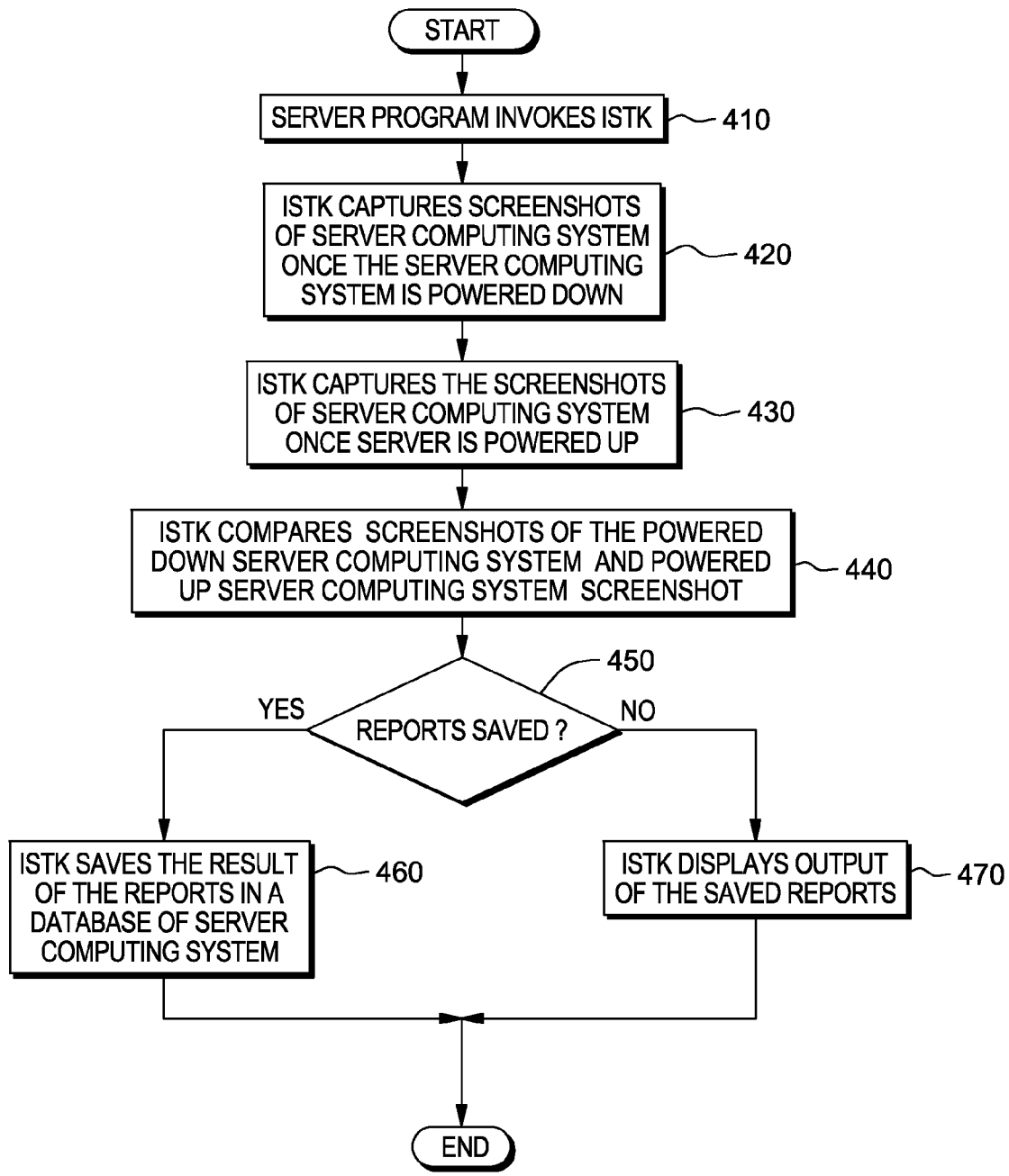
FIG. 4 is a flow diagram depicting steps performed by an integrated system tool kit to verify operational performance of a z/OS® application, including, summary of reports of operational changes or operational measures of the z/OS® application in accordance with at least one embodiment of the present invention.

FIG. 4 is a flow diagram depicting steps performed by ISTK 310 to verify operational performance of z/OS® application 108, including, summary of reports of operational changes or operational measures of z/OS® application 108 in accordance with at least one embodiment of the present invention. In the depicted environment, ISTK 310 is invoked by mainframe server program 104 to perform automated operating system verification, syslog verification, third party vendor or independent software vendor product checkouts of z/OS® application 108. (Step 410). For example, ISTK 310 can be designed to provide automatic system verification process of operational changes or measures of z/OS® application 108 for transmittal of a report of the operational measures for display to administrator 103 on administrative client program 111. Further, ISTK 310 captures screenshots or system snapshots of z/OS® application 108 before mainframe server system 105 is downgraded or powered down. (Step 420). The screenshots can include program list of z/OS® application 108, including, for example, linklist, aplist, lpalst list, version information list, page data sets list, and system memory list of z/OS® application 108.

ISTK 310 further captures screenshots of z/OS® application 108 once mainframe server system 105 is powered up. (Step 430). ISTK 310 can also be consecutively executed once the mainframe server system 105 is powered up, wherein ISTK 310 captures screenshots of z/OS application 108 over a period of consecutive sessions. ISTK 310 stores the captured snapshots of z/OS® application 108 in a database storage device 106.

Moreover, ISTK 310 compares the captured screenshot of z/OS® application 108 during downgrade of mainframe server system 105 and during upgrade of mainframe server system 105. (Step 440). ISTK transmits a display of results of the compared captured screenshots of z/OS® application 108 during upgrade or when server computing device was powered up to administrator client program 111 for display on administrative web page module 200. For example, a display of the compared captured screenshots by ISTK 310, allows administrator 103 to identify performance verification of z/OS® application 108, including, operational changes of z/OS® application 108. For example, ISTK 310 determines if the compared result are stored in database storage device 106. (Decision 450). If the reports are saved, ISTK 310 saves results of the reports in database storage device 106. (Step 460). However, if the results of the comparison reports are not saved, ISTK 120 displays an output of the saved in administrator client program 111 (Step 470).

Figure 5:
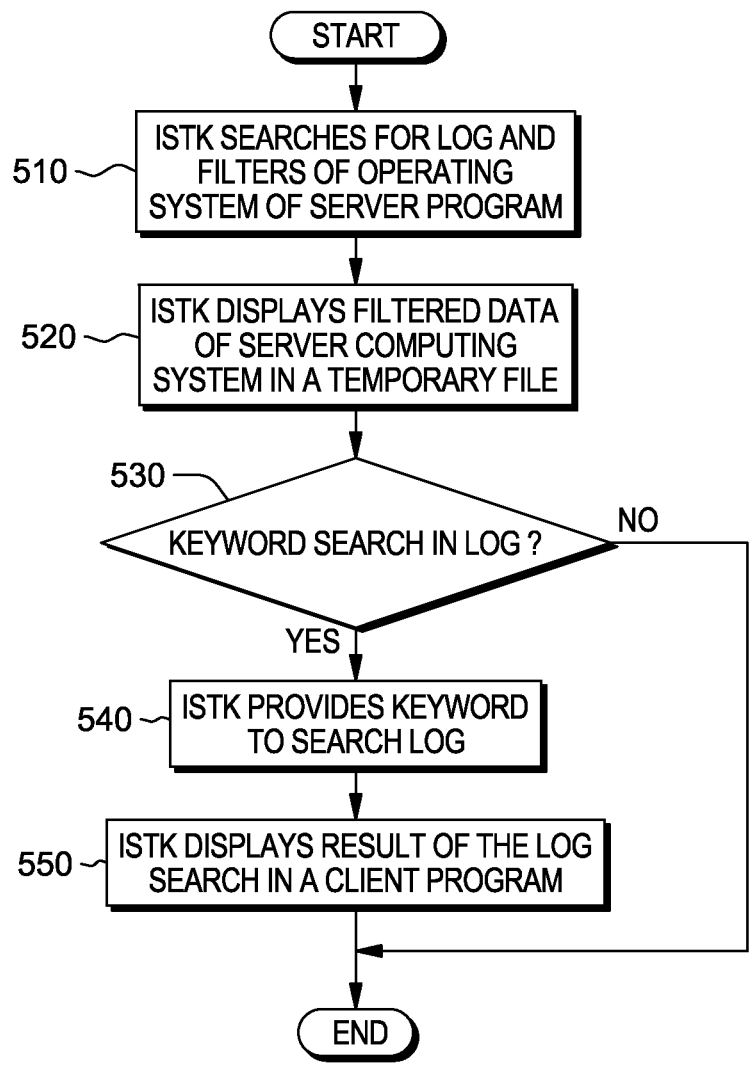
FIG. 5 is a flow diagram depicting steps performed by an integrated system tool kit of a mainframe server program to verify system log verification of a z/OS® application of the mainframe server system in accordance with embodiments of the present invention.

FIG. 5 is a flow diagram depicting steps performed by ISTK 310 to perform z/OS® application 108 verify system log (syslog) verification z/OS® application 108 of mainframe server system 105, in accordance with embodiments of the present invention. According to at least one embodiment, ISTK 310 searches for log and filters of z/OS® application 108, including, for example, logs and filter of z/OS® application 108. (Step 510). ISTK 310 transmits a displayed of filtered data of z/OS® application 108 to database storage device 106. (Step 520). ISTK 310 determines if there is a keyword search in syslog of z/OS® application 108. (Decision 530). For example, if there is no keyword search in the syslog, then, the process of searching for a keyword in the syslog ends. However, if there is a keyword search in the log, then ISTK 310 provides keyword search log of z/OS® application 108. (Step 540). Further, ISTK 310 transmits results of the keyword search log of z/OS® application 108 for display in administrator client program 111 for viewing by administrator 103. (Step 550).

Figure 6:
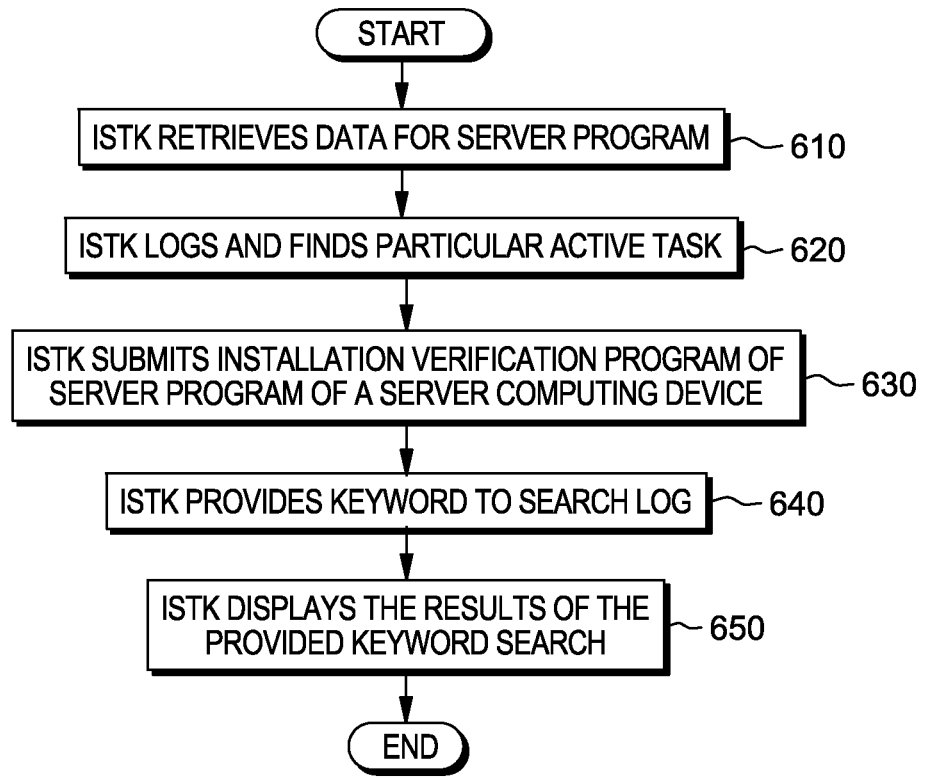
FIG. 6 is a flow diagram depicting steps performed by an integrated system tool kit of a mainframe server program to verify performance of third party vendors of the mainframe server system in accordance with embodiments of the present invention.

FIG. 6 is a flow diagram depicting steps performed by ISTK 310 to perform z/OS® application 108 performance verification of third party vendors of mainframe server system 105 in accordance with the present invention. ISTK 310 retrieves data of mainframe server program 104 for verification of z/OS® application 108. (Step 610). According to at least one embodiment, ISTK 310 logs data of verified task of z/OS® application 106 by determining active task of data of z/OS® application 106. (Step 620). ISTK 310 further verifies installation of a third party programs or tools of z/OS® application 108. (Step 630). ISTK 310 provides keyword or version search of system logs from z/OS® application 108 for verification of the third party program or tools of z/OS® application 108 (Step 640). ISTK 310 transmits results of the keyword search to administrator client program 111, in accordance with at least one embodiment of the present invention. (Step 650).

Figure 7:
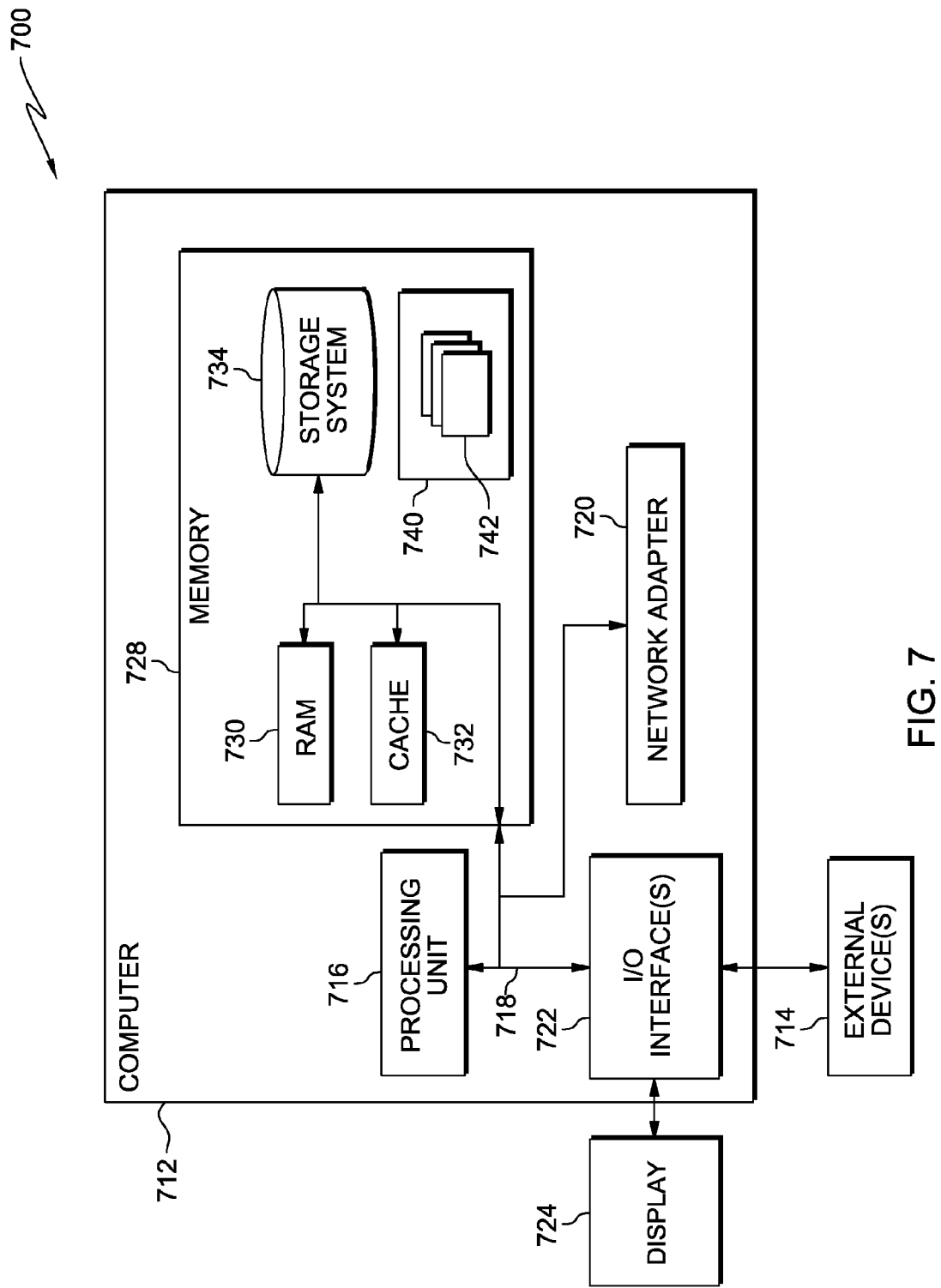
FIG. 7 illustrates a block diagram of components of a computer system in accordance with embodiments of the present invention.

FIG. 7 is a functional block diagram of a computer system, in accordance with an embodiment of the present invention.

Computer system 700 is only one example of a suitable computer system and is not intended to suggest any limitation as to the scope of use or functionality of embodiments of the invention described herein. Regardless, computer system 700 is capable of being implemented and/or performing any of the functionality set forth hereinabove. In computer system 700 there is computer 712, which is operational with numerous other general purpose or special purpose computing system environments or configurations. Examples of well-known computing systems, environments, and/or configurations that may be suitable for use with computer 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Administrator client program 111 and mainframe server program 104 can be implemented as an instance of computer 712.

Computer 712 may be described in the general context of computer system executable instructions, such as program modules, being executed by a computer system. Generally, program modules may include routines, programs, objects, components, logic, data structures, and so on that perform particular tasks or implement particular abstract data types. Computer 712 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 7, computer 712 is shown in the form of a general-purpose computing device. The components of computer 712 may include, but are not limited to, one or more processors or processing units 716, memory 728, and bus 718 that couples various system components including memory 728 to processing unit 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 712 typically includes a variety of computer system readable media. Such media may be any available media that is accessible by computer 712, and includes both volatile and non-volatile media, and removable and non-removable media.

Memory 728 includes computer system readable media in the form of volatile memory, such as random access memory (RAM) 730 and/or cache 732. Computer 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Administrator client program 111 and mainframe server program 104 can be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein. Each one of Administrator client program 111 and mainframe server program 104 can be implemented as an instance of program 740.

Computer 712 may also communicate with one or more external devices 714 such as a keyboard, a pointing device, etc., as well as display 724; one or more devices that enable a user to interact with computer 712; and/or any devices (e.g., network card, modem, etc.) that enable computer 712 to communicate with one or more other computing devices. Such communication occurs via Input/Output (I/O) interfaces 722. Still yet, computer 712 communicates with one or more networks such as a local area network (LAN), a general wide area network (WAN), and/or a public network (e.g., the Internet) via network adapter 720. As depicted, network adapter 720 communicates with the other components of computer 712 via bus 718. It should be understood that although not shown, other hardware and/or software components could be used in conjunction with computer 712. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations are implemented by special purpose hardware-based systems that perform the specified functions or acts, or combinations of special purpose hardware and computer instructions.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that contains, or stores a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for embodiments of the present invention may be written in any combination of one or more programming languages, including an object oriented programming language such as Java, Smalltalk, C++ or the like, conventional procedural programming languages such as the "C" programming language, a hardware description language such as Verilog, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method, system and computer program product method for monitoring z/OS® program application performance within a mainframe server system have been described. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. Therefore, the present invention has been disclosed by way of example and not limitation.

What is claimed is:

1. A computer implemented method for operating system application performance verification of a mainframe server system, the method comprising:

comparing, by one or more processors, system snapshots of an operating system application before and after a mainframe server system is rebooted, wherein comparison of the system snapshots includes performance verification of the system snapshots of the operating system application;

determining, by the one or more processors, results of operational changes to the operating system application based on the compared system snapshots;

comparing, by the one or more processors, system log verification of the operating system application with previous system logs of the operating system application, the comparing includes system libraries, and status of memory of the mainframe server system;

determining, by the one or more processors, results of operational changes to the operating system application based on the compared system log verification with the previous system logs;

performing, by the one or more processors, system checkouts of vendor tools installed on the operating system application;

monitoring the results of operational changes of the operating system application and the system log verification of the operating system application for operational errors of the operating system application; and transmitting a debugging aid of the operational errors to an interface of a device.

2. The method according to claim 1, further including the steps of:
    storing, by the one or more processors, the results of the operational changes to the operating system application based on the compared system snapshots before and after the mainframe server system is rebooted; and
    transmitting, by the one or more processors, the results of the operational changes to the operating system application based on the compared system snapshots before and after the mainframe server system is rebooted to an interface of a device.

3. The method according to claim 2, wherein the results of the operational changes of the operating system application based on the compared system snapshots before and after the mainframe server system is rebooted includes an information list, a page data sets list, and a system memory list of the operating system application.

4. The method according to claim 1, further including the steps of:
    utilizing, by the one or more processors, an integrated system kit to perform the operating system application performance verification of the mainframe server system, wherein the integrated system kit performs the operating system application performance verification over consecutive periods, unless or until the integrated system kit is invoked to perform the operating system application performance verification; and
    invoking, by the one or more processors, command structures to perform the operating system application performance verification, wherein the command structures are restructured extended executors of the integrated system kit, and wherein the restructured extended executors provide dynamic command procedures, or operating system application prototyping of the integrated system kit.

5. The method according to claim 1, wherein the step of determining, by the one or more processors, results of operational changes of the operating system application based on the system log verification of the operating system application with the previous system logs of the operating system application, further including the step of:
    searching, by the one or more processors, system logs of the operating system application, and wherein the search of the system logs includes a keyword search.

6. The method according to claim 1, wherein the step of performing, by the one or more processors, system checkouts of vendor tools installed on the operating system application, further including the step of:
    determining, by the one or more processors, active system data tasks of the operating system application.

7. A computer system for operating system application performance verification of a mainframe server system, the computer system comprising:
    one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
        program instructions to compare system snapshots of an operating system application before and after a mainframe server system is rebooted, wherein comparison of the system snapshots includes performance verification of the system snapshots of the operating system application;
        program instructions to determine results of operational changes to the operating system application based on the compared system snapshots;
        program instructions to compare system log verification of the operating system application with previous system logs of the operating system application, the comparing includes system libraries, and status of memory of the mainframe server system;
        program instructions to determine results of operational changes to the operating system application based on the compared system log verification with the previous system logs;
        program instructions to perform system checkouts of vendor tools installed on the operating system application;
        program instruction to monitor the results of operational changes of the operating system application and the system log verification of the operating system application for operational errors of the operating system application; and
        program instruction to transmit a debugging aid of the operational errors to an interface of a device.

8. The computer system according to claim 7, further includes:
    program instructions to store the results of the operational changes to the operating system application based on the compared system snapshots before and after the mainframe server system is rebooted; and
    program instructions to transmit the results of the operational changes to the operating system application based on the compared system snapshots before and after the mainframe server system is rebooted to an interface of a device.

9. The computer system according to claim 8, wherein the results of the operational changes of the operating system application based on the compared system snapshots before and after the mainframe server system is rebooted includes an information list, a page data sets list, and a system memory list of the operating system application.

10. The computer system according to claim 7, further includes:
    program instructions to utilize an integrated system kit to perform the operating system application performance verification of the mainframe server system, wherein the integrated system kit performs the operating system application performance verification over consecutive periods, unless or until the integrated system kit is invoked to perform the operating system application performance verification; and
    program instructions to invoke command structures to perform the operating system application performance verification, wherein the command structures are restructured extended executors of the integrated system kit, and wherein the restructured extended executors provide dynamic command procedures, or operating system application prototyping of the integrated system kit.

11. The computer system according to claim 7, wherein program instructions to determine results of operational changes of the operating system application based on the system log verification of the operating system application with the previous system logs of the operating system application, further includes:
    program instructions to search system logs of the operating system application, and wherein the search of the system logs includes a keyword search.

12. The computer system according to claim 7, wherein program instructions to perform system checkouts of third party vendor tools installed on the operating system application, further includes: program instructions to determine active system data tasks of the operating system application.

13. A computer program product for operating system application performance verification of a mainframe server system, the computer program product comprising:
one or more computer-readable tangible storage devices and program instructions stored on at least one of the one or more storage devices, the program instructions comprising:
program instructions to compare system snapshots of an operating system application before and after a mainframe server system is rebooted, wherein comparison of the system snapshots includes performance verification of the system snapshots of the operating system application;
program instructions to determine results of operational changes to the operating system application based on the compared system snapshots;
program instructions to compare system log verification of the operating system application with previous system logs of the operating system application, the comparing includes system libraries, and status of memory of the mainframe server system;
program instructions to determine results of operational changes to the operating system application based on the compared system log verification with the previous system logs;
program instructions to perform system checkouts of vendor tools installed on the operating system application;
monitoring the results of operational changes of the operating system application and the system log verification of the operating system application for operational errors of the operating system application; and
transmitting a debugging aid of the operational errors to an interface of a device.

14. The computer program product according to claim 13, further includes:
program instructions to store the results of the operational changes to the operating system application based on the compared system snapshots before and after the mainframe server system is rebooted; and
program instructions to transmit the results of the operational changes to the operating system application based on the compared system snapshots before and after the mainframe server system is rebooted to an interface of a device.

15. The computer program product according to claim 14, wherein the results of the operational changes of the operating system application based on the compared system snapshots before and after the mainframe server system is rebooted includes an information list, a page data sets list, and a system memory list of the operating system application.

16. The computer program product of claim 13, further includes:
program instructions to utilize an integrated system kit to perform the operating system application performance verification of the mainframe server system, wherein the integrated system kit performs the operating system application performance verification over consecutive periods, unless or until the integrated system kit is invoked to perform the operating system application performance verification; and
program instructions to invoke command structures to perform the operating system application performance verification, wherein the command structures are restructured extended executors of the integrated system kit, and wherein the restructured extended executors provide dynamic command procedures, or operating system application prototyping of the integrated system kit.

17. A method for performing operating system (OS) checkout procedures, the method, computer system and computer program product comprising:
performing, by a first tool, OS checkout procedures on system libraries of a mainframe computer;
performing, by the first tool, OS checkout procedures on status of a memory of the mainframe computer;
performing, by the first tool, OS checkout procedures on any system changes made to the mainframe computer; and
performing, by the first tool, OS checkout procedures for third party products installed on the mainframe computer,
wherein system log verification of an operating system application includes comparing with previous system logs of the operating system application, and the first tool monitors the results of operational changes of the operating system application and the system log verification of the operating system application for operational errors of the operating system application, and initiates a transmittal of a debugging aid of the operational errors to an interface of a device.

* * * * *